US009784822B2

(12) United States Patent
Metz et al.

(10) Patent No.: US 9,784,822 B2
(45) Date of Patent: *Oct. 10, 2017

(54) TIME OF FLIGHT SENSOR BINNING

(71) Applicant: TEXAS INSTRUMENTS INCORPORATED, Dallas, TX (US)

(72) Inventors: Werner Adam Metz, Chandler, AZ (US); Dong-Ik Ko, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/853,194

(22) Filed: Sep. 14, 2015

(65) Prior Publication Data

US 2016/0003937 A1 Jan. 7, 2016

Related U.S. Application Data

(63) Continuation of application No. 13/792,431, filed on Mar. 11, 2013, now Pat. No. 9,134,114.

(51) Int. Cl.
*G01B 11/22* (2006.01)
*G01S 7/486* (2006.01)
(Continued)

(52) U.S. Cl.
CPC .......... *G01S 7/4865* (2013.01); *G01B 11/026* (2013.01); *G01B 11/24* (2013.01);
(Continued)

(58) Field of Classification Search
CPC ....... G01B 11/026; G01B 11/24; G01S 17/08; G01S 17/89; G01S 7/48; G01S 7/4808;
(Continued)

(56) References Cited

U.S. PATENT DOCUMENTS

| 7,406,181 | B2 |   | 7/2008 | O'Boyle et al. |
| 8,179,445 | B2 | * | 5/2012 | Hao .................. G06T 3/4053 |
|           |    |   |        | 348/208.13 |

(Continued)

FOREIGN PATENT DOCUMENTS

| CN | 102447939 A | 5/2012 |
| DE | 102011089629 A1 | 6/2012 |

(Continued)

OTHER PUBLICATIONS

Kolb, Andreas et al., "Time-of-Flight Sensors in Computer Graphics", Eurographics, 2009, 17 pages.

(Continued)

*Primary Examiner* — Christopher S Kelley
*Assistant Examiner* — Kathleen Walsh
(74) *Attorney, Agent, or Firm* — Gregory J. Albin; Charles A. Brill; Frank D. Cimino

(57) ABSTRACT

A time-of-flight sensor device generates and analyzes a high-resolution depth map frame from a high-resolution image to determine a mode of operation for the time-of-flight sensor and an illuminator and to control the time-of-flight sensor and illuminator according to the mode of operation. A binned depth map frame can be created from a binned image from the time-of-flight sensor and combined with the high-resolution depth map frame to create a compensated depth map frame.

12 Claims, 7 Drawing Sheets

(51) Int. Cl.

| | | |
|---|---|---|
| *G01B 11/02* | (2006.01) | |
| *G01B 11/24* | (2006.01) | |
| *G01S 17/89* | (2006.01) | |
| *G01S 7/48* | (2006.01) | |
| *G01S 7/491* | (2006.01) | |
| *G01S 17/08* | (2006.01) | |
| *H04N 13/00* | (2006.01) | |

(52) U.S. Cl.
CPC .............. *G01S 7/48* (2013.01); *G01S 7/4808* (2013.01); *G01S 7/4911* (2013.01); *G01S 7/4915* (2013.01); *G01S 7/4918* (2013.01); *G01S 17/08* (2013.01); *G01S 17/89* (2013.01)

(58) Field of Classification Search
CPC .... G01S 7/4865; G01S 7/4911; G01S 7/4915; G01S 7/4918; H04N 13/00
USPC .......................................... 348/46; 356/5.01
See application file for complete search history.

(56) References Cited

U.S. PATENT DOCUMENTS

| | | | |
|---|---|---|---|
| 8,233,077 B2 | 7/2012 | Safaee-Rad et al. | |
| 8,330,822 B2* | 12/2012 | McEldowney | A63F 13/213 315/309 |
| 8,405,680 B1 | 3/2013 | Lopes et al. | |
| 8,442,355 B2* | 5/2013 | Imai | G06T 3/4061 345/419 |
| 8,471,895 B2 | 6/2013 | Banks | |
| 8,937,646 B1 | 1/2015 | Baldwin | |
| 9,134,114 B2* | 9/2015 | Metz | G01S 17/89 |
| 2002/0036765 A1 | 3/2002 | McCaffrey et al. | |
| 2005/0111700 A1 | 5/2005 | O'Boyle et al. | |
| 2008/0158268 A1 | 7/2008 | Hui | |
| 2008/0231835 A1 | 9/2008 | Iizuka | |
| 2009/0167930 A1 | 7/2009 | Safaee-Rad et al. | |
| 2010/0128109 A1 | 5/2010 | Banks | |
| 2011/0025827 A1* | 2/2011 | Shpunt | H04N 13/0239 348/47 |
| 2011/0122308 A1 | 5/2011 | Duparre | |
| 2011/0157354 A1 | 6/2011 | Kawahito | |
| 2011/0211749 A1* | 9/2011 | Tan | G06T 7/136 382/154 |
| 2011/0267495 A1* | 11/2011 | Atkinson | H04N 5/23245 348/229.1 |
| 2011/0304696 A1 | 12/2011 | Centen et al. | |
| 2012/0056982 A1* | 3/2012 | Katz | H04N 13/025 348/43 |
| 2012/0074296 A1 | 3/2012 | Hammes et al. | |
| 2012/0075534 A1* | 3/2012 | Katz | H04N 9/3182 348/602 |
| 2012/0098935 A1* | 4/2012 | Schmidt | G01S 17/89 348/46 |
| 2012/0120285 A1* | 5/2012 | Ko | G01S 7/4865 348/241 |
| 2012/0154542 A1 | 6/2012 | Katz et al. | |
| 2012/0167930 A1 | 7/2012 | Chen | |
| 2012/0176476 A1* | 7/2012 | Schmidt | G01S 17/89 348/46 |
| 2012/0237114 A1 | 9/2012 | Park et al. | |
| 2012/0249738 A1* | 10/2012 | Gilboa | G01S 17/89 348/46 |
| 2013/0038881 A1* | 2/2013 | Pesach | G01B 11/25 356/610 |
| 2013/0148102 A1 | 6/2013 | Oggier | |
| 2014/0049610 A1* | 2/2014 | Hudman | G01S 17/89 348/46 |
| 2014/0139631 A1* | 5/2014 | Mark | G06F 3/0304 348/46 |
| 2014/0253688 A1* | 9/2014 | Metz | G01S 17/89 348/46 |

FOREIGN PATENT DOCUMENTS

| | | |
|---|---|---|
| EP | 2378488 A2 | 10/2011 |
| EP | 2469301 A1 | 6/2012 |
| EP | 2487504 A1 | 8/2012 |
| WO | WO 2010029481 A1 | 3/2010 |

OTHER PUBLICATIONS

Patent Prosecution History for U.S. Appl. No. 13/792,431, dated from Mar. 11, 2013 to Aug. 27, 2015, 267 pages.

Kolb, Andreas et al., "Time-of-Flight Sensors in Computer Graphics", vol. XX (200y), No. Z, pp. 1-16.

International Search Report, PCT/US2014/022329 dated Aug. 21, 2014, 1 page.

European Patent Office Search Report and Opinion, Application No. 14778179.3-181212997421 PCT/US2014022329, mailed Jan. 30, 2017 (7 pages).

* cited by examiner

TIME OF FLIGHT SENSOR BINNING

CROSS-REFERENCE TO RELATED APPLICATIONS

This application is a Continuation of and claims priority to U.S. patent application Ser. No. 13/792,431, filed Mar. 11, 2013—now U.S. Pat. No. 9,134,114 granted on Sep. 15, 2015.

TECHNICAL FIELD

This invention relates generally to time-of-flight sensors, and more particularly to processing of images from time-of-flight sensors.

BACKGROUND

Time-of-flight sensors, as generally understood in the art, are used to determine a distance of an object from the sensor. Time-of-flight sensors operate by detecting light reflected off of a surface of the object where the light is emitted from a illuminator that is generally co-located with the sensor. Using the time-of-flight sensor, a processing device can determine the round-trip travel time of light emitted from the light source and reflected off of the object back to the sensor. With this information, and with the knowledge of the speed of light (constant c), the processing device can determine the distance of the object.

For any given physical area of a time-of-flight sensor, there is a fundamental tradeoff between optical sensitivity and image resolution. Smaller pixels generally provide a higher resolution by allowing more pixels in that given area than do larger pixels. However, larger pixels, by virtue of their increased area, are more sensitive to light (particularly, the light from the illuminator reflected off of the object of interest) and provide increased light detection and larger signal output as compared to smaller pixels.

Currently, a solution to providing adequate light detection using smaller pixels simply involves increasing the light illuminator output, thus providing for a higher intensity of reflected light to be detected by the pixels. Another solution involves limiting how small the pixels can be, which in turn limits the resolution of the image, or alternatively, requires a much larger physical area for the time-of-flight sensor. However, given the proliferation of mobile devices and other wireless or portable devices, a flexible solution combining lower light illuminator output power with higher resolution features with a smaller sensor footprint is desirable to conserve battery power and maximize performance while maintaining a usable sensor footprint, amongst other improvements.

SUMMARY

Generally speaking and pursuant to these various embodiments, an apparatus utilizing a time-of-flight sensor can adaptively and dynamically adjust illuminator power output and image resolution according to the needs of a given scene. By this, the time-of-flight device is flexible such that it is capable of reducing power consumption by reducing illuminator power output when appropriate while maintaining an increased image resolution. These and other benefits may become clearer upon making a thorough review and study of the following detailed description.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
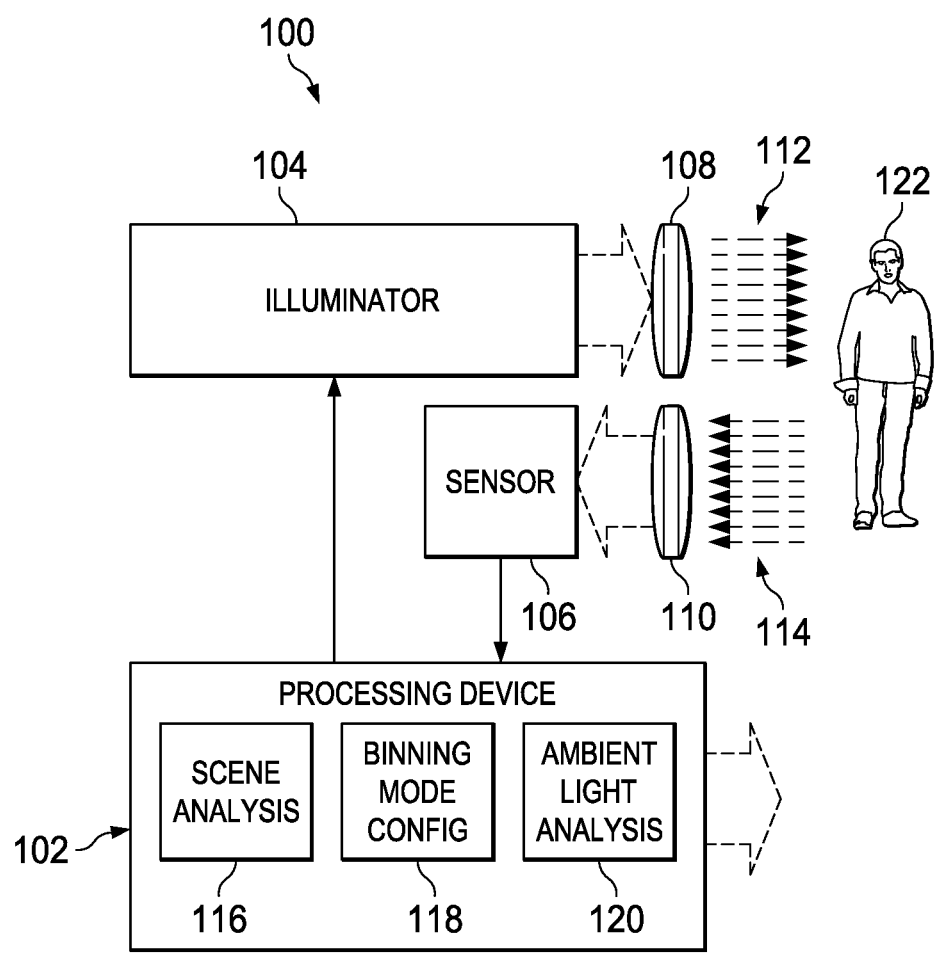
FIG. 1 is block diagram of a time-of-flight apparatus in accordance with various embodiments.

Referring now to the drawings, FIG. 1 is an illustration of a time-of-flight apparatus 100 in accordance with various embodiments. The apparatus 100 includes at least one processing device 102 and at least illuminator 104 operatively coupled to the processing device 102 and at least one time-of-flight image sensor 106 operatively coupled to the processing device 102. The illuminator 104 and the time-of-flight sensor 106 may be equipped with or coupled to various optical elements 108 and 110, such as lenses, prisms, or the like. For example, the illuminator 104 may be equipped with a lens 108 to effect dispersion or focusing of emitted light 112, or simply a clear or translucent membrane to protect the illuminator 104. Further, the time-of-flight sensor 106 may be configured to receive incoming light 114 through one or more lenses 110 to focus the image upon the sensor 106, in much the same manner as an image sensor of a conventional digital camera.

The processing device 102 comprises at least a scene analysis module 116 and a binning mode configuration module 118, the operations of which are described further herein. By other approaches, the processing device 102 may also include other modules, such as an ambient light analysis module 120.

In operation, the apparatus 100 is configured to generate depth map frames 312, 810 (see FIGS. 3 and 8) as are commensurate with time-of-flight sensing and/or imagery or other uses. Depth map frames 312, 810 can be generated by many means, but time-of-flight sensors 106 generally operate on the principle that a distance to a surface of a detected object 122 can be calculated if the speed of an item, substance, or phenomenon (i.e., protons or light) is known and the time required to travel that distance is known. In this instance, the speed of light is known (the constant c, approximately 300,000,000 meters per second) and the time that light takes to travel from the illuminator 104 to the detected object 122 and back to the sensor 106 can be measured. Though the illuminator 104 and sensor 106 are not necessarily required to be co-located (or nearly co-located as compared to the distance of the object 122), if they are co-located, then the distance is simply half of the total distance measured for the round trip.

Various kinds of light can be emitted by the illuminator 104 to be utilized in the disclosed embodiments, including infrared (IR) light, visible spectrum light, or ultraviolet light. By other embodiments, other forms of electromagnetic radiation can be utilized, including radio waves, microwaves, x-rays, and gamma rays, or any combination thereof. IR light is most often utilized as it is invisible to humans, can be relatively inexpensive to produce, and behaves similarly to visible light. Accordingly, IR light is assumed to be used in this disclosure as a non-limiting example for the sake of description and widespread applicability.

The illuminator 104 may comprise various known or unknown light emitters, such as a light emitting diode (LED), lasers, precision incandescent lights, shuttered light sources, and other precision light sources. In some situations, an LED may be ideally suited for use as the illuminator 104 as its light emission start and stop times can be controlled with high precision to produce well defined pulses of light 112, which can aid in the precision of the measurements. Further, LEDs provide an efficient solution as the illuminator output power is high compared to the input electrical power.

In one embodiment, a depth z can be calculated or estimated for each pixel of a time-of-flight sensor 106 based on the following equation:

$$z = \frac{c\Phi}{4\pi f} \quad [1]$$

where c is the speed of light, $\Phi$ is the angular phase of the detected pulse of light 114 with respect to the emitted pulse of light 112, and f is the modulated frequency of the emitted light 112. In this configuration, the maximum distance that can be reliably detected is determined by the following equation:

$$z_{max} = \frac{c}{2f} \quad [2]$$

Any distance past that may either result in failure to detect or aliasing if the distance is so far that the reflected pulse of light 114 arrives at the sensor 106 during the next sensor reading period. It should be noted, however, that aliasing issues can be alleviated or accommodated for by utilizing techniques involving varying the frequency or period of the emitted pulses of light 112 so that the apparatus 100 can determine which outgoing pulse it detected (i.e., the one it is currently emitting or just sent out, or the previous pulse, or a pulse even prior to that). However, it should also be noted that the further the detected object 122 is from the illuminator 104 and sensor 106, the weaker the power of the reflected pulse of light 114 will be, to a point where a given apparatus 100 may not be able to detect the reflected pulse of light 114 due to being lost in the noise or being simply too weak.

Figure 2:
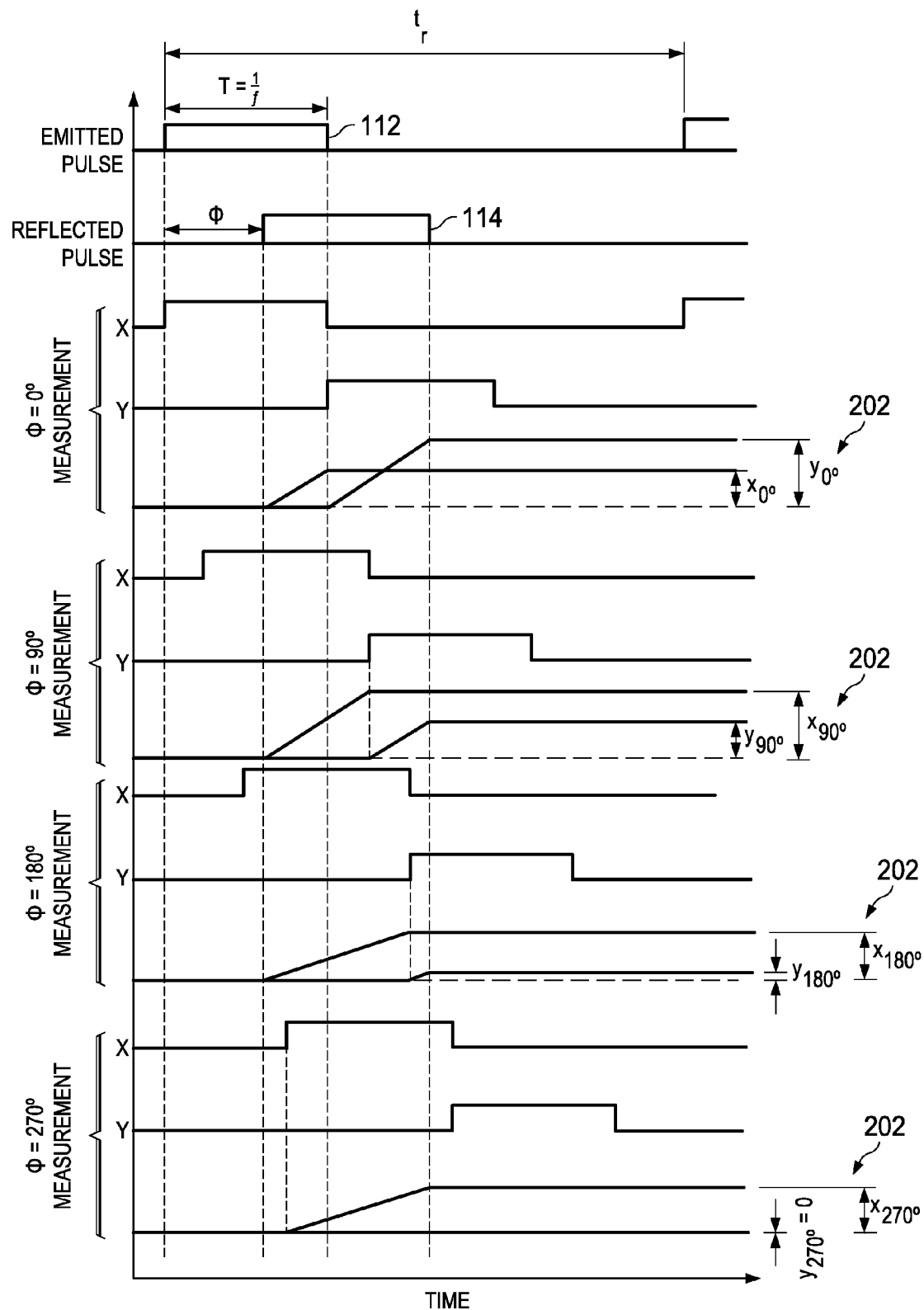
FIG. 2 is a signal chart representing the operation of a time-of-flight sensor in accordance with various embodiments.

FIG. 2 provides a signal-based representation of an example operation of a time-of-flight apparatus 100. As described above, the top signal represents an outgoing emitted pulse of light 112. The outgoing emitted pulse of light 112 is emitted with a frequency of f, which, when depicted in the time-based scale of FIG. 2, is represented by its pulse width period T, which is simply 1/f. The emitted pulse of light may be re-transmitted after a time $t_r$. The second signal represents the reflected pulse of light 114 received at a pixel of the time-of-flight sensor 106. As is shown in FIG. 2, the reflected pulse of light 114 is delayed as compared to the emitted pulse of light 112 by an angular phase $\Phi$ of the period T of the emitted pulse of light 112. As an example, FIG. 2 shows the phase $\Phi$ as approximately 225° (i.e., five-eighths), meaning the beginning of the reflected pulse of light 114 first hit the sensor 106 about five-eighths through the period T during which that same pulse of light 112 was being emitted.

One method of determining the phase $\Phi$ of the reflected pulse of light 114 is to utilize two photosites in each pixel, called photosite X and photosite Y. The photosites each measure the light received at the pixel during different time segments. As is shown in FIG. 2, for example, photosite X may be active during the same period T during which the emitted pulse of light is emitted. At the end of that period T, photosite X may discontinue measurement of received light while at the same time photosite Y may begin measurement of received light. Photosite Y may make a measurement for the same duration of time period T as did photosite X. As photons from the reflected pulse of light 114 hits each photosite, they will each build and store a charge 202 during the time which each photosite is enabled to measure the reflected pulse of light. The charge 202 generated at photosite X is represented by the line $x_{0°}$, and the charge 202 generated at photosite Y is represented by the line $y_{0°}$. During the time which photosite X is active, as the reflected pulse of light 114 begins to encounter the pixel, photosite X will build a charge $x_{0°}$ as more photons continue to be collected in photosite X. This is shown by the positive slope of the line $x_{0°}$ during the time the reflected pulse of light 114 encounters photosite X while it is active. Similarly, when photosite Y becomes active, it will generate and store a charge $y_{0°}$ as is shown by the positive slope of the line $y_{0°}$ during the time when the reflected pulse of light 114 encounters photosite Y while it is active. Upon the completion of the measurement duration time, the charges $x_{0°}$ and $y_{0°}$ can be collected and converted into digital signals to be processed by the processing device 102. The relative charges $x_{0°}$ and $y_{0°}$ are used to calculate the phase $\Phi$ of the reflected pulse of light 114.

It should be noted that although two photosites X and Y are described, other configurations are possible. For example, a single photosite can be utilized that employs a fast switching gate arrangement that will store the accumulated charge 202 into two separate charge wells or charge repositories during their respective times, one storing charge $x_{0°}$, representing the time during which "photosite X" is active and the other storing charge $y_{0°}$, representing the time during which "photosite Y" is active.

Continuing with FIG. 2, it may be beneficial by some embodiments to take reflected pulse of light phase measurements across a plurality of measurement period phases φ, wherein the angular phase φ of the active times of photosites X and Y are shifted by various amounts. For example, and as is depicted in FIG. 2, four equally spaced phase φ measurements periods are shown, one at φ=0°, one at φ=90°, one at φ=180°, and one at φ=270°, though many other configurations are possible by varying the number and phase φ of the measurement periods. The four depicted phase measurements periods represent four different times measuring four different reflected pulse of light 114, but are depicted in relation to a single emitted and reflected pulse of light 114 for simplicity. The phased measurement periods will provide different values of the charges 202 x and y for each phase φ measurement period (i.e., $x_{0°}$ and $y_{0°}$, $x_{90°}$ and $y_{90°}$, $x_{180°}$ and $y_{180°}$, $x_{270°}$ and $y_{270°}$ to provide additional information with which to make a more accurate reflected pulse of light 114 phase Φ estimate. The measurements at each phase φ, resulting from the x and y charge 202 readings, are represented by m(φ=0°), m(φ=90°), m(φ=180°), and m(φ=270°), respectively. Phase Φ can then be calculated according to the following formula:

$$\Phi = \frac{m(\varphi = 0°) - m(\varphi = 180°)}{m(\varphi = 90°) - m(\varphi = 180°)} \quad [3]$$

This more accurate phase Φ estimate can then be inserted into formula [1] above to calculate distance z measured at the subject pixel. When this occurs simultaneously for an entire set of pixels for a time-of-flight sensor 106, a depth map frame 312 can be formed. The depth map frame 312 represents distances z for each pixel, resulting in a three-dimensional (3D) reading or image.

Figure 3:
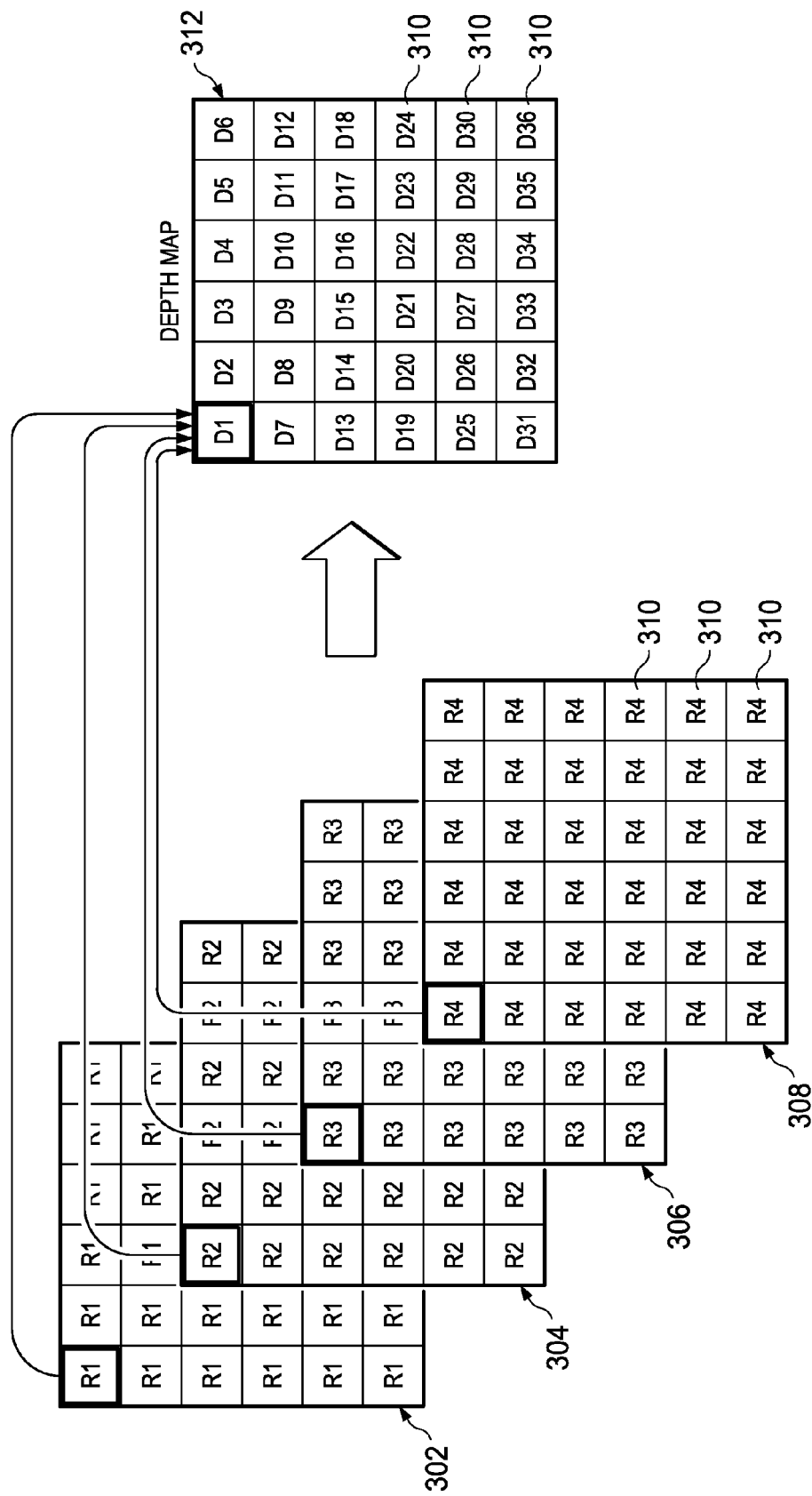
FIG. 3 illustrates a simplified view of a depth map creation process in accordance with at least one embodiment.

FIG. 3 illustrates a simplified view of the depth map frame creation process in accordance with at least one embodiment. Each reading m(φ=0°), m(φ=90°), and so forth, by the time-of-flight sensor 106 is represented by the images 302, 304, 306, and 308. For each phase φ measurement, the respective image 302, 304, 306, 308 will contain individual measurements for each pixel 310 (i.e., charges 202 x and y), represented in FIG. 3 as "R1" for m(φ=0°), "R2" for m(φ=90°), and so forth. The various measurements for each pixel 310 are then processed per equations [3] and [1] above to produce the depth map frame 312. As shown in FIG. 3, each pixel 310 of the depth map frame 312 has a corresponding calculated z value represented by "D1", "D2", and so forth. The depth map frame 312 can then be used for many purposes, one of which includes combining it with a standard two-dimensional image taken simultaneously, or near simultaneously, to provide depth to each 2D pixel resulting in a visible 3D image.

The range of the time-of-flight apparatus 100 is dependent on the frequency of the emitted pulse of light 112, as described above in equation [2]. However, the range is also dependent upon various other factors of the apparatus 100, including the optics (for example, lenses 108, 110), illuminator output power, and pixel sensitivity. Additionally, the range is also dependent upon various environmental factors that may exist at the time of measurement, including, for example, ambient light interference. The apparatus 100 and methods presented in this disclosure seek to vary the factors associated with the apparatus 100 to maximize performance of the system, be it maximizing range, power savings, and/or spatial resolution.

Range (R) typically scales with illuminator output power. As the emitted pulse of light 112 travels from the illuminator 104 to the detected object 122 and back to the image sensor 106, the power of the reflected pulse of light 114 will have dissipated. The optical power of the reflected pulse of light 114 ($P_{reflected}$) relative to the power of the emitted pulse of light 112 ($P_{emitted}$) is represented by the inverse square of the range:

$$P_{reflected} = \frac{P_{emitted}}{R^2} \quad [4]$$

The scaling factor of $1/R^2$ presents the theoretical best case scenario, while a more typical real-world relationship of approximately $1/R^3$, $1/R^4$, or even worse, should be expected, for example, due to scattering by airborne particles and the like. Thus, for example, given a fixed pixel sensitivity, to double the range R, the illuminator optical output power needs to increase by 4 times ($2^2=4$) at a minimum and possibly by as much as 16 times ($2^4=16$).

Range also scales with pixel sensitivity. Given a fixed physical area for a time-of-flight sensor 106, there is a tradeoff between sensitivity and resolution. The sensitivity of each pixel 310 is a function of the quantum efficiency (i.e., percentage of incoming photons converted to signal electrons) and the physical area of the pixel 310. A larger pixel 310 will gather more light per pixel 310 to generate a larger charge 202 and provide a greater output signal. Conversely, a smaller the pixel 310 will provide increased spatial resolution as more pixels are able to be fit onto the given fixed physical area of the time-of-flight sensor 106. However, this increased spatial resolution comes at the cost of a reduced signal output as each pixel 310 can gather fewer photons (light). Thus, smaller pixels 310 require a higher optical power for the reflected pulse of light 114 to generate an equivalent output signal as a larger pixel 310. For example, if a larger pixel 310 has twice the sensitivity of smaller pixel 310, then, theoretically, it will require half the optical power of the sensed incoming reflected pulse of light 114 to generate the same charge 202 output.

The optimized tradeoff between illuminator output power, pixel sensitivity, and spatial resolution can change dynamically based on many real-time factors, including range, object reflectivity, ambient light levels, signal noise, available power, power savings settings, required spatial resolution, required accuracy, overall purpose of the reading, and many other dynamic or static factors. To optimize the tradeoff between output power, pixel sensitivity, and spatial resolution, a modified time-of-flight sensor 106 pixel structure and signal processing chain is disclosed herein.

Figure 4:
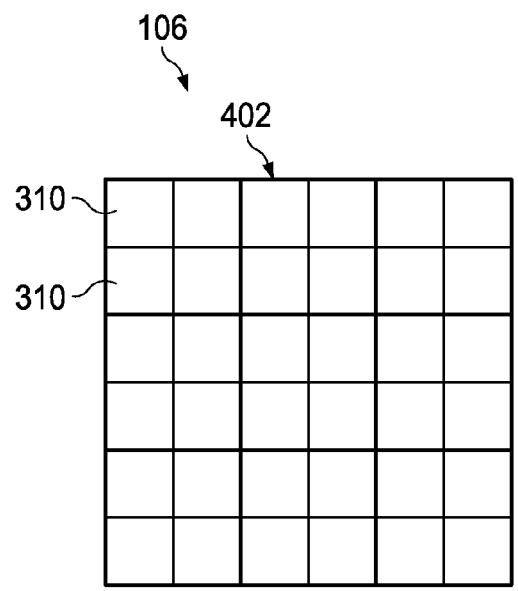
FIG. 4 illustrates an example binned time-of-flight sensor in accordance with at least one embodiment.

According to one approach, the time-of-flight sensor 106 is capable of pixel binning when operating in a binning mode. For example, and with reference to FIG. 4, an example time-of-flight sensor 106 has groups of four sensor pixels 310 that are binned together to form a binned pixel 402. The example binned pixel 402 will then have approximately four times the sensitivity (though the spatial resolution of the time-of-flight sensor 106 overall will be reduced by approximately one fourth) as it is capable of collecting four times as much light. Although four pixels 310 are shown binned together in FIG. 4, any number of pixels 310 can be binned together to form a binned pixel 402. For example, two pixels 310 can be binned together (corresponding to a binning factor of 2), three pixels 310 can be binned together (corresponding to a binning factor of 3), and so forth. A combination of multiple binned pixels 402 of varying binning factor and non-binned pixels 310 can be simultaneously used. The most common approach will involve binning factors that result in square or rectangle binned pixels 402 (i.e., binning factors of 1, 2, 4, 9, 16, etc). Most binned pixels 402 will incorporate adjacent pixels to form rectangular or square binned pixels 402, though other configurations are possible including binned pixels 402 comprised of pixels 310 in rows, pixels 310 simply near each other, or even pixels 310 spread across the time-of-flight sensor 106 in a random or organized pattern.

During the binned mode of operation, the individual signal charges 202 from the pixels 310 are combined or summed with each other (i.e., x charges combined with other x charges, y charges combined with other y charges) to form the increased signal output of the binned pixel 402. The merging of these individual charges 202 can be done digitally after the charges 202 have been converted to digital signals. However, a more useful embodiment involves summing the charges 202 on the time-of-flight sensor 106 in analog prior to being converted to digital signals. For example, the time-of-flight sensor 106 may comprise a plurality of pixel charge aggregators 702 (see FIG. 7) that are configured to aggregate a plurality of analog pixel charges 202. By this, a plurality of binned analog pixel charges 504 (see FIGS. 5-7) may be combined together to make up a binned image 802, 804, 806, 808 (see FIG. 8). Further, the time-of-flight sensor 106 may be configured to temporarily store individual charge 202 information from at least one sensor pixel 310 aggregated with charge 202 information from at least one other sensor pixel 310 within the binned group to form the binned pixel 402. However, when operating in full-resolution mode, the time-of-flight sensor 106 may be configured to temporarily store charge 202 information only from individual sensor pixels 310 without such aggregation.

Binned sensor pixels 402 will provide an increased binned charge 504 or analog signal that can be fed to an analog-to-digital converter (ADC), which will result in an improved signal-to-noise ratio. An ADC can often be a source of noise, particularly when the incoming analog signal is low. Thus, increasing the incoming analog signal will improve the resolution of the digital conversion and help preserve the quality of the reading. Further, by some embodiments, summing the charges 202 on-chip and local to the binned pixel 402 will reduce the effect of other noise that can be introduced during transportation across the time-of-flight sensor 106. By one approach, the time-of-flight sensor 106 comprises a Charge-Coupled Device (CCD), and this transport comprises the charges being transported out of the CCD during readout, which transport can inject noise. As the larger binned charges 504 are transported or converted, the effect of the added noise becomes less meaningful when compared to the larger charge 504.

Figure 5:
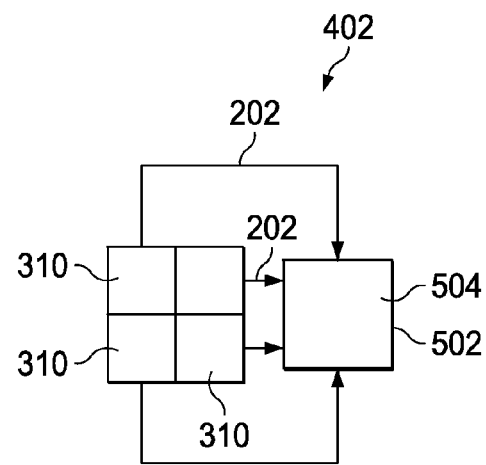
FIG. 5 illustrates an example mode of pixel binning in accordance with various embodiments.
Figure 6:
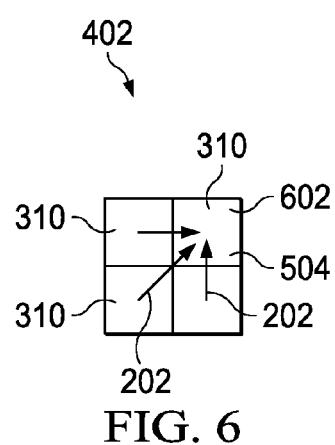
FIG. 6 illustrates another example mode of pixel binning in accordance with various embodiments.
Figure 7:
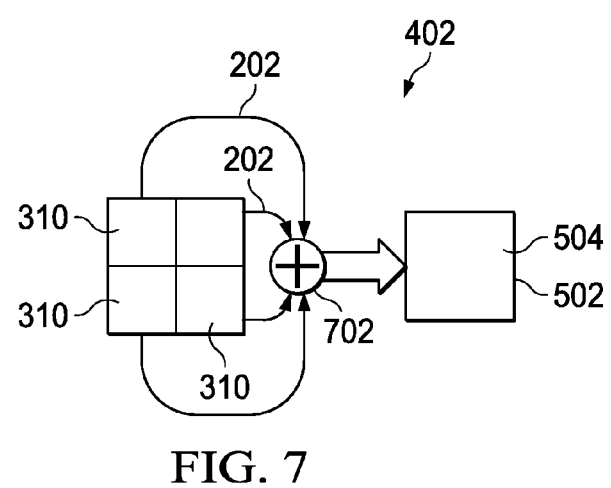
FIG. 7 illustrates yet another example mode of pixel binning in accordance with various embodiments.

Referring now to FIGS. 5-7, various example modes of pixel binning are illustrated. By one approach, the charge 202 from each photosite (i.e., x or y) in each pixel 310 is directly dumped into a charge repository 502, as is shown in FIG. 5, wherein their charges are combined by simply being dumped into the charge repository to form a binned charge 504. Thus, the charge repository 502 acts as a charge aggregator 702 (see FIG. 7). By another approach, the charges 202 from the pixels 310 in a binned pixel 402 may be combined into a single pixel 602 of the binned pixel 402 as is shown in FIG. 6. Here, an additional charge repository 502 may not be necessary, and the charge can be transported out by known CCD means or other methods. Additionally still, in a CCD configuration, charges 202 can be combined by successive additions of charges 202 to a floating node, possibly during transport out, to form the binned charge 504. By yet another approach, the charges 202 may be subject to aggregation by a charge aggregator 702 prior to being dumped into a charge repository 502, as is shown in FIG. 7, the charge repository 502 possibly acting a floating node. This aggregation of the charges prior to temporary storage in a charge repository 502 may be as is illustrated in FIG. 6 (through aggregation to a single pixel 602 prior to being dumped to a charge repository 504), or may involve a separate charge aggregator 702, or may be by other means. Further, in the event a photodiode is used for charge collection, then a gate similar to that used for node resetting can be used to merge the charges. Other known methods of pixel binning may be utilized with the present time-of-flight sensor 106, all of which are contemplated by the present disclosure.

Figure 8:
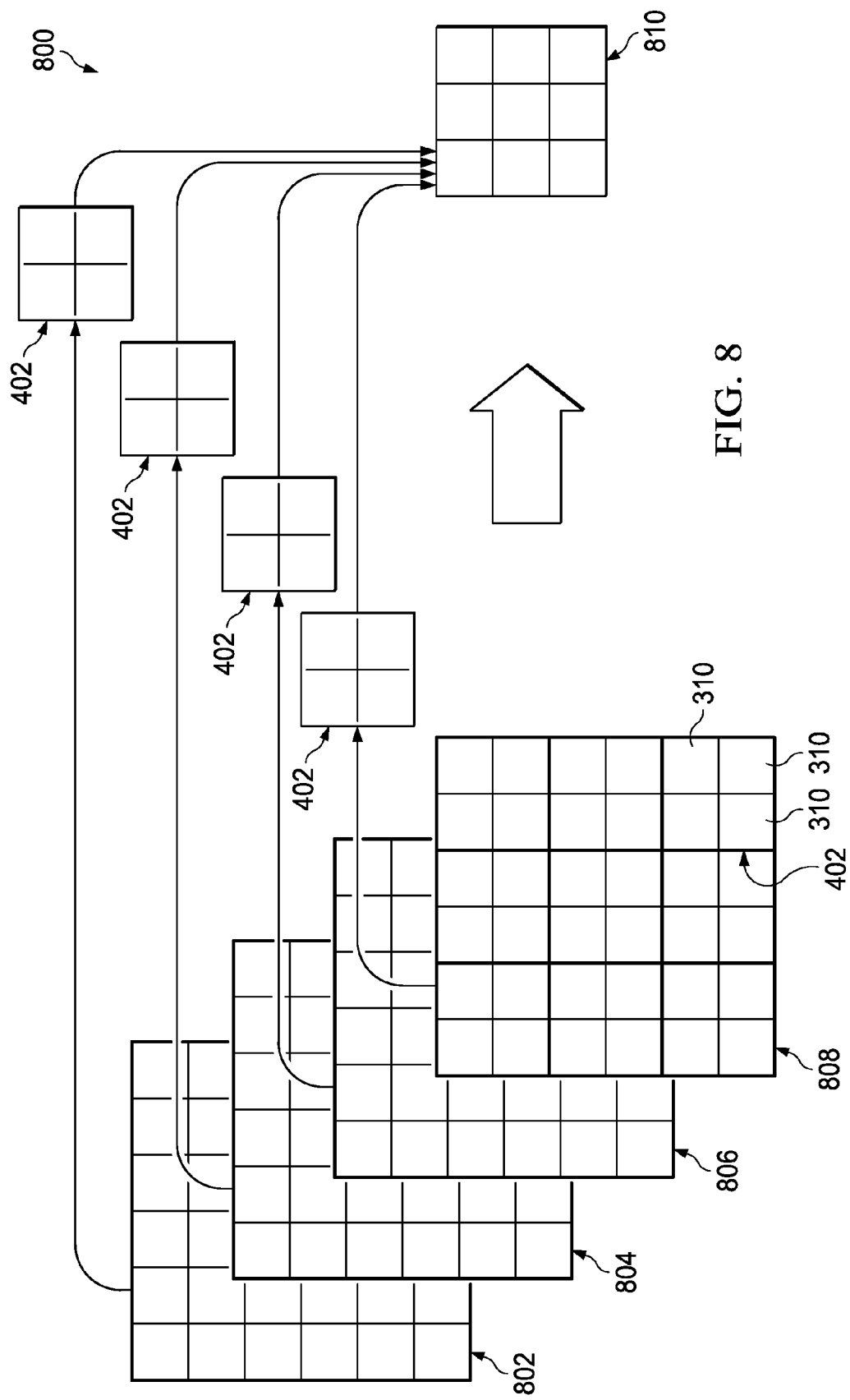
FIG. 8 illustrates a simplified view of a binned depth map creation process in accordance with various embodiments.

FIG. 8 is a modified version of FIG. 3 that illustrates the binning mode of operation 800. As with FIG. 3, four different phase measurements are taken resulting in four different images (though any number can be utilized). However, these images are binned lower-resolution images 802, 804, 806, 808 according to the binning mode of operation 800 (shown here with an example binning factor of 4 corresponding to 4 pixels 310 per binned pixel 402). The binned pixels 402 of the binned lower-resolution images 802, 804, 806, 808 are then processed via equations [1] and [3] above, much like in FIG. 3, to produce the binned lower-resolution depth map 810. The binned lower-resolution depth map 810 will contain more accurate z depth measurements per binned pixel 402 than would a full resolution depth map as the binned pixels 402 are more sensitive and the binned charges 504 are less susceptible to noise. This effect is amplified as the binning factor increases, but of course, at the expense of spatial resolution.

In the case where on-chip charge binning is not used, binning takes place digitally after signal readout and ADC conversion. In the instance of weak charge signals 202 produced by individual pixels 310, the noise introduced by transport during signal readout and by the ADC will dominate the signal, thus greatly degrading the quality of the measurement and seriously degrading system performance. The on-chip binning mode as disclosed herein can accommodate these weaker signals 202 by summing the charges 202 to produce the binned charge 504 that will rise above the noise floor, thus lessening the influence of the noise and improving the quality of the measurement and system performance.

The time-of-flight sensor 106 is also capable of being dynamically configured into various binning factors and binning configurations as is required, often by instructions of the processing device 102. The binning factors and configurations can be pre-set so that a processing device 102 provides instructions to enter into one of the pre-set configurations, or can be specified in detail by the processing device 102. Control communication between the processing device 102 and the time-of-flight sensor 106 can be by any known means, including serial or parallel digital communications, a plurality of signal lines of which various combinations comprise various instructions, analog signal control, and the like.

By altering the binning mode of the time-of-flight sensor 106, the sensitivity of the pixels 310, 402 of the time-offlight sensor 106 can be dynamically optimized in real-time according to the needs of the apparatus 100 and its environment. For example, by increasing the pixel sensitivity with a binned pixel 402 of greater binning factor, the range R can increase for a fixed illuminator output power, $P_{emitted}$. Alternatively, by increasing the pixel sensitivity, the illuminator power output, $P_{emitted}$, can be reduced for a fixed range R, thus saving power.

This dynamic operation provides a marked improvement in the performance and optimization of a time-of-flight apparatus 100. Without on-chip binning, sensors are not capable of such dynamic operation. Accordingly, to achieve the highest range possible, such previous time-of-flight apparatuses were required to be designed such that a maximum illuminator output would be required at all times. This would result in wasted power because the previous time-of-flight apparatus could not bin the pixels 310 on-chip to reduce the required illuminator power output or reduce power in instances where the maximum power was not necessarily required (i.e., when the detected object 122 is close). Further, because the pixels 310 could not be binned, previous time-of-flight devices would digitally process the full resolution image 302, 304, 306, 308 rather than a binned lower-resolution image 802, 804, 806, 808. This resulted in wasted processing time and wasted power in instances where a full resolution image 302, 304, 306, 308 may not be necessary (i.e., when the detected object 122 is near or when the depth measurement does not necessarily require a full resolution image).

Figure 9:
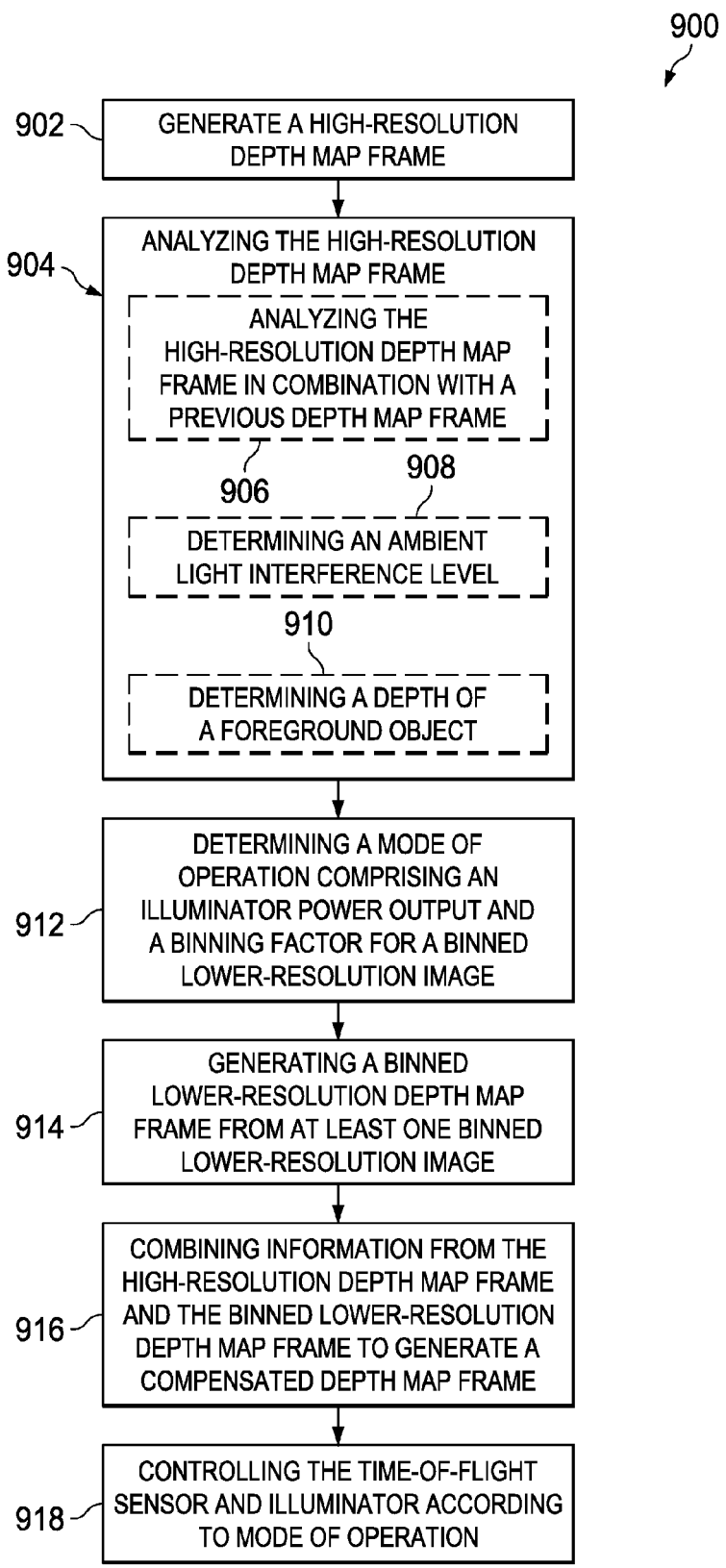
FIG. 9 illustrates an example method for use with the time-of-flight sensor in accordance with various embodiments.

Turning now to FIG. 9, a method 900 for use with the above described time-of-flight sensor 106 is disclosed. By one embodiment, the method 900 comprises generating 902 by at least one processing device 102 at least one high-resolution depth map frame 312 from at least one high-resolution image 302, 304, 306, 308 received from the time-of-flight sensor 106. The high-resolution image 302, 304, 306, 308 and the resulting high-resolution depth map frame 312 may be of full-resolution or simply of a lower or equal binning factor than the binning factor of a binned lower-resolution image 802, 804, 806, 808 and binned lower-resolution depth map frame 810. At least one method of generating the high-resolution depth map frame 312 from at least one high-resolution image 302, 304, 306, 308 has been described above, though other methods may be utilized.

The method 900 continues by the processing device 102 analyzing 904 the at least one high-resolution image or the high-resolution depth map frame. This analysis 904 may occur in a scene analysis module 116 of the processing device 102 or an ambient light analysis module 120 that may be part of or separate from the scene analysis module 116. By various embodiments, this 904 analysis may comprise determining 908 an ambient light interference level and/or determining 910 a depth of at least one foreground object 122 in the image (though non-foreground objects could be detected instead in certain embodiments). Many other aspects of the high-resolution image 302, 304, 306, 308 or depth map 312 can be analyzed, including but not limited to a signal-to-noise ratio (SNR), as well as the stability of the various aspects over time.

The analysis 904 of the high-resolution depth map frame 312 or image 302, 304, 306, 308 may be performed in conjunction with analysis 904 of one or more previously calculated depth map frames 312 or captured images 302, 304, 306, 308, together or separately with the newer high-resolution depth map frame 312 or image 302, 304, 306, 308. For example, analysis could be of the average of some measurement of the current high-resolution depth map frame 312 and the immediately prior high-resolution depth map frame 312 so as to introduce an aspect of control system stability. The previous depth map frame 312 or image 302, 304, 306, 308, however, does not necessarily need to be of the same binning factor or resolution as the current high-resolution depth map frame 312 or image 302, 304, 306, 308, and it does not necessarily need to directly precede it. By other approaches, the processing device 102, possibly by the scene analysis module 116, can monitor the change of various aspects of the depth map frames 312, 810 or images 302, 304, 306, 308, 802, 804, 806, 808. For example, the processing device 102 can perform least-squares-fit analysis on a plurality of previous measurements or can keep a running average of a set number of previous measurements of some aspect to aid in making future determinations. In one example, the scene analysis module can analyze SNR over time and determine if a factor is improving or worsening to help determine the settings for future measurements.

Using the analysis 904 from the scene analysis module 116, the processing device 102 is further configured to determine 912 a mode of operation, possibly using a binning mode configuration module 118. The mode of operation comprises at least a binning factor for at least one binned lower-resolution image 802, 804, 806, 808 and a calculated illuminator power output level (i.e., $P_{emitted}$). Alternatively, the binning mode configuration module could determine a lower binning factor (or a zero binning rate for a full-resolution image) based on the analysis 904. For purposes of description, however, this example involves determining a higher binning factor to create the binned lower-resolution image(s) 802, 804, 806, 808.

After the mode of operation is determined 912, the processing device 102 controls 918 the time-of-flight sensor 106 and the illuminator 104 according to the mode of operation. The illuminator 104 emits the emitted pulse of light 112 at a power specified by the illuminator power output level of the mode of operation, and the time-of-flight sensor 106 captures at least one binned lower-resolution image 802, 804, 806, 808 according to the binning factor of the mode of operation. By one approach, the time-of-flight sensor 106 captures four images 802, 804, 806, 808 at various phases ϕ, as is shown and described in FIG. 8. The processing device 102 receives this binned lower-resolution image or collection of binned lower-resolution images 802, 804, 806, 808 and in turn generates 914 the binned lower-resolution depth map frame 810 from the received binned image or images 802, 804, 806, 808.

After generating 914 both a high-resolution depth map frame 312 and a binned lower-resolution depth map frame 810, the processing device 102 then combines 916 information from the at least one higher-resolution depth map frame 312 with information from the at least one binned lower-resolution depth map frame 810 to generate at least one compensated depth map frame. A data stream including depth map data can then be encoded in a method similar to typical video compression. For example, and drawing an analogy to video compression methods, the higher-resolution depth map frame 312 can correspond to an "I" frame and the binned lower-resolution depth map frame 810 can correspond to a "P" or "B" frame. The "I" depth map frame 312 can be used to track fine movements (i.e., fingers, facial movements, etc.), whereas the binned "B" depth map frame 810 can be used to track gross movements (i.e., hands, limbs, body or other skeletal movements, etc.). By using a combination of the full or higher-resolution "I" depth map frames 312 and the binned "B" depth map frames 810, the time-of-flight apparatus 100 can interpolate the continuous scene movements to generate compensated depth map frames without requiring exclusive use of full resolution depth map frames. This results in much lower average power usage and/or increased range, as discussed above.

Figure 10:
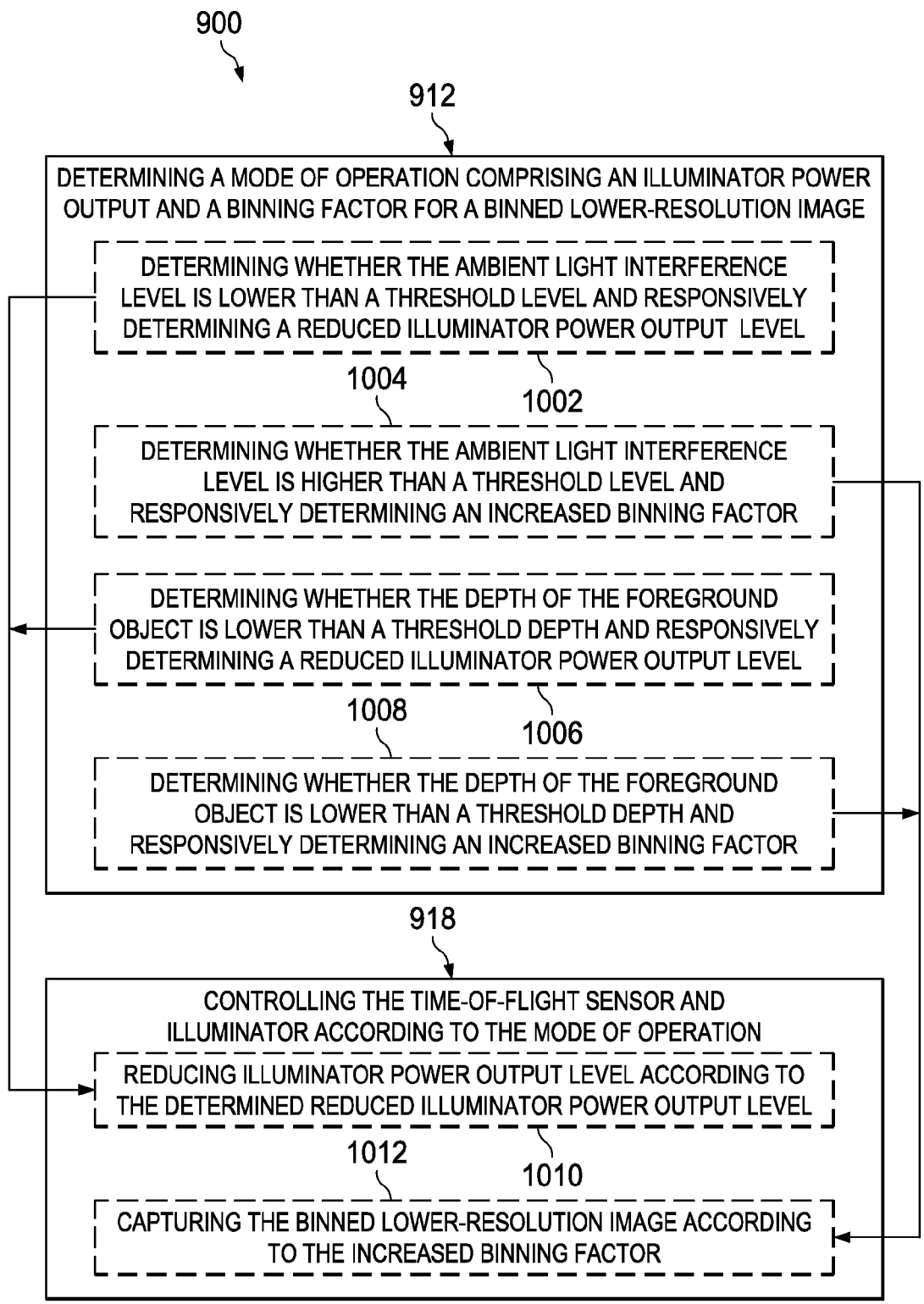
FIG. 10 illustrates further example aspects of the method of FIG. 9 in accordance with various embodiments.

Turning now to FIG. 10, further aspects of the method 900 are illustrated in accordance with various embodiments. As discussed above, the processing device 102 can determine 912 the mode of operation comprising an illuminator output power and a binning factor for the binned lower-resolution image 810. Altering these factors within the mode of operation allows for dynamic adaptation of the mode of operation to suit the needs of the scene or other settings.

In one example, the processing device 102 can determine whether an ambient light interference level is lower than or higher than a threshold level. The ambient light interference level may be a determination of how much ambient light is captured by the time-of-flight sensor 106 that may interfere with sensing of the returning reflected pulse of light 114. The ambient light under analysis may be a portion of the spectrum of light that corresponds to the spectrum utilized by the illuminator 104 (i.e., IR), or may encompass a broader spectrum of light, possibly analyzing all light spectrums captured by the time-of-flight sensor 106. The threshold ambient light interference level may represent a single threshold (fixed or variable) or multiple thresholds (fixed or variable) corresponding to different levels of ambient light and multiple modes of operation depending upon the needs of the apparatus 100.

Upon determining 1002 that the ambient light interference level is lower than a threshold level, the processing device 102 may responsively determine 1002 a reduced illuminator output power level. The processing device 102 can then control 918 the time-of-flight sensor 106 and the illuminator 104 according to the mode of operation by reducing 1010 the illuminator power output level according to the determined reduced illuminator power output level. Conversely, if the processing device 102 determines that the ambient light interference level is higher than a threshold level, it may responsively determine an increased illuminator power output level. The processing device 102 can then control 918 the time-of-flight sensor 106 and the illuminator 104 according to the mode of operation by increasing the illuminator power output level according to the determined increased illuminator power output level. Accordingly, as one aspect of the mode of operation, the processing device 102 can vary the output power of the illuminator 104 as is required by the scene and/or settings, which in turn can result in a power savings and increased range.

By another embodiment, upon determining that the ambient light interference level is lower than a threshold level, the processing device 102 may responsively determine a reduced binning factor (corresponding to a higher-resolution image). The processing device 102 can then control 918 the time-of-flight sensor 106 and the illuminator 104 according to the mode of operation by capturing a higher-resolution image (binned or full resolution) according to the reduced binning factor. Conversely, if the processing device 102 determines 1004 that the ambient light interference level is higher than a threshold level, it may responsively determine 1004 an increased binning factor. The processing device 102 can then control 918 the time-of-flight sensor 106 and the illuminator 104 according to the mode of operation by capturing 1012 a binned lower-resolution image according to the determined increased binning factor. By this, as one aspect of the mode of operation, the processing device 102 can vary the binning factor as is required by the scene and/or settings, which in turn can result in a power savings and increased range. It is understood that the processing device 102 may alter either or both of the illuminator output power or the binning factor individually or simultaneously according to the ambient light interference level as is needed.

By yet another approach, the processing device 102 can determine whether a depth of a foreground object 122 is lower or higher than a threshold depth. The foreground object 122 may be one or more objects 112 that are of interest to the time-of-flight apparatus 100 and may be selected based on proximity to the time-of-flight sensor 106 as determined by previous time-of-flight measurements (i.e., the closest objects to the time-of-flight sensor 106), location within the depth map frame (i.e., within a center portion of the frame), the size of the object 122 (the largest detected object), a selection of the object 122 by a user of the time-of-flight apparatus 100 as the foreground object 122, or other automatic or manual determinations of the foreground object 122. In some instances, the foreground object 122 may itself not be in the actual foreground and may reside further away in the depth map frame 312, 810 than other objects 122 that are closer. Like the ambient light interference threshold level, the threshold depth may represent a single threshold (fixed or variable) or multiple thresholds (fixed or variable) corresponding to different depths and multiple modes of operation depending upon the needs of the apparatus 100.

The determination of depth can be useful as a reflected pulse of light 114 that returns after reflection off of a closer object 122 will suffer less power loss during flight (i.e., will be brighter) than after reflection off of a farther object 122. Thus, less illuminator output power is required to be able to properly sense the light. Alternatively, the binning factor of the time-of-flight images 802, 804, 806, 808 can be altered according to various needs.

Upon determining 1006 that the depth of the foreground object 122 is lower than a threshold depth (i.e., the object 122 is closer than the threshold depth), the processing device 102 may responsively determine 1006 a reduced illuminator power output level. The processing device 102 can then control 918 the time-of-flight sensor 106 and the illuminator 104 according to the mode of operation by reducing the illuminator power output level according to the determined reduced illuminator power output level. Conversely, if the processing device 102 determines that the depth of the foreground object 122 is higher than the threshold depth (i.e., the object 122 is further away than the threshold depth), it may responsively determine an increased illuminator power output level. The processing device 102 can then control 918 the time-of-flight sensor 106 and the illuminator 104 according to the mode of operation by increasing the illuminator power output level according to the determined increased illuminator power output level. Accordingly, as one aspect of the mode of operation, the processing device 102 can vary the output power of the illuminator 104 as the depth of the foreground object 122 varies, which in turn can result in a power savings and increased range.

By another approach, upon determining that the depth of the foreground object 122 is lower than a threshold depth, the processing device 102 may responsively determine a reduced binning factor (corresponding to a higher-resolution image). This is so because the returning pulses of light 114 will be brighter, and thus more easily sensed, allowing for higher resolution detailed depth maps 312 that do not require as much (or any) binning to properly sense the reflected pulse of light 114. The processing device 102 can then control 918 the time-of-flight sensor 106 and the illuminator 104 according to the mode of operation by capturing a higher-resolution image (binned or full resolution) according to the reduced binning factor. Conversely, if the processing device 102 determines that the depth of the foreground object 122 is higher than a threshold depth, it may responsively determine an increased binning factor to accommodate for the diminished power of the reflected pulses of light. The processing device 102 can then control 918 the time-of-flight sensor 106 and the illuminator 104 according to the mode of operation by capturing a binned image according to the determined increased binning factor.

Alternatively, the time-of-flight apparatus 100 may vary the binning factor according to the depth of the foreground object 122 in an opposite manner than described above. For example, if it is determined 1008 that the depth of the foreground object 122 is lower than a threshold depth, then the processing device 102 may actually determine 1008 an increased binning factor instead. Accordingly, the processing device 102 can capture 1012 the binned lower-resolution image according the increased binning factor. This may be advantageous in that when an object 122 is closer, less spatial resolution may be required in a depth map 312, 810 (because the image of the object 122 may take up more pixels of the time-of-flight sensor 106). When such detailed spatial resolution is not required, the binning factor can be increased to provide a lower-resolution image 802, 804, 806, 808. This not only saves processing power as the processing device 102 has fewer pixels to process, but allows for a lowered illuminator output power to be used, which saves power. Conversely, when the processing device 102 determines that the depth of the foreground object 122 is higher than a threshold depth (it is further away), then it may decrease the binning factor to allow for increased spatial resolution as may be required to properly capture it in the depth map. The processing device 102 can then capture a higher-resolution image according the decreased binning factor.

By these multiple embodiments described above, the processing device 102 is capable of varying the mode of operation by varying the binning factor and/or the illuminator output power as is required by the scene (i.e., ambient light and/or depth of foreground objects 122) and/or the settings (i.e., relative importance of resolution and/or power savings). Other factors not specifically discussed herein may be of importance to a determination of a mode of operation and are fully contemplated by this application. Examples of such factors may include interference by fog or other small particles, optical performance of the apparatus 100, user or designer settings, rate of change of the depth of an object 122, physical steadiness or shakiness of the time-of-flight sensor 106, the number or size of objects 122, a desire to mask a scene beyond the foreground object 122 (as reflected pulses of light from the scene beyond the detected object 122 may not be able to be sensed, thus masking the scene around the object 122), the simultaneous use of other time-of-flight apparatuses 100, processing power (of the processing device 102 or another processing device) or features required by other applications, requirements driven by other applications that utilize the time-of-flight apparatus 100, the quality or size of the power source, the power source type, or any other factor. These factors can change over time and can dynamically influence the mode of operation. For example, an apparatus 100 may be battery powered and as the remaining power nears exhaustion, the time-of-flight apparatus 100 may be configured to value power savings over spatial resolution.

By varying the mode of operation of the time-of-flight sensor 106 and illuminator output power, a time-of-flight apparatus 100 can be more ideally suited for a wider range of applications. For example, the apparatus 100 can be optimized for a setting where power is relatively unlimited (when plugged in) or optimized for battery operation. Further, the relatively small form factor allows for easy integration into many devices, such as dedicated time-of-flight sensing apparatuses 100, mobile devices such as cell phones, GPS systems, PDAs, notebooks, tablets, and the like, or any other device that would benefit from the use of an incorporated time-of-flight sensor 106 or apparatus 100.

The time-of-flight apparatus 100 can comprise a single chip solution that comprises the time-of-flight sensor 106, the processing device 102, and the illuminator 104, or just the time-of-flight sensor 106 and the processing device 102. It may further exist as individual distinct items or a kit comprising any number of the items. It may further be directly integrated into the hardware and software of a product into which it is integrated, wherein the sensor 106 and processing device 102 may share their functionality with processes beyond only time-of-flight measurement. For example, the sensor 106 may also capture visual images such as would a standard CCD camera sensor, and the processing device 102 may operate as the main or peripheral processor of a larger system (i.e., of a mobile phone). Further, one or more computer readable media may contain instructions, code, or processes that enable the time-of-flight apparatus to operate as described herein.

With this described time-of-flight sensor 106 and apparatus 100, a flexible solution that can balance and optimize a combination of factors including power conservation, image resolution, sensing range, and image integrity is provided to conserve battery power and maximize performance, amongst other improvements.

Many of the functional units described in this specification have been labeled as modules, in order to more particularly emphasize their implementation independence. For example, a module may be implemented as a hardware circuit comprising custom Very-Large-Scale Integrated (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method for use with a time-of-flight sensor, the method performed via a processing device associated with the time-of-flight sensor, the method comprising:
   generating a high-resolution depth map frame from a high-resolution image received from the time-of-flight sensor;
   determining an illuminator power output level of an illuminator associated with the processing device, and a binning factor for a binned lower-resolution image;
   generating a binned lower-resolution depth map frame from the binned lower-resolution image; and
   combining information from the high-resolution depth map frame with information from the binned lower-resolution depth map frame to generate a compensated depth map frame.

2. The method of claim 1, wherein prior to determining, analyzing the high-resolution depth map frame and the high-resolution image.

3. The method of claim 1, wherein determining the illuminator power output level and the binning factor for the binned lower-resolution image comprises determining a mode of operation.

4. The method of claim 3 further comprising controlling the time-of-flight sensor and the illuminator according to the mode of operation.

5. The method of claim 2, wherein analyzing the high-resolution depth map frame and the high-resolution image further comprises determining an ambient light interference level.

6. The method of claim 4, wherein:
   determining the mode of operation comprises determining whether an ambient light interference level is lower than a threshold ambient light interference level, and
   determining a reduced illuminator power output level in response to determining that the ambient light interference level is lower than the threshold ambient light interference level; and
   controlling the illuminator according to the mode of operation comprises reducing the illuminator power output level according to the determined reduced illuminator power output level.

7. The method of claim 4, wherein:
   determining the binning factor for the binned lower-resolution image further comprises:
      determining whether an ambient light interference level is higher than a threshold ambient light interference level; and
      determining an increased binning factor for the binned lower-resolution image in response to determining that the ambient light interference level is higher than the threshold ambient light interference level; and
   controlling the time-of-flight sensor according to the mode of operation further comprises capturing the binned lower-resolution image according to the increased binning factor.

8. The method of claim 4, wherein:
analyzing the high-resolution depth map frame and the high-resolution image further comprises determining a depth of a foreground object;
determining the mode of operation comprises:
   determining whether the depth of the foreground object is lower than a threshold depth; and
   determining a reduced illuminator power output level in response to determining that the depth of the foreground object is lower than the threshold depth; and
controlling the illuminator according to the mode of operation further comprises reducing the illuminator power output level according to the determined reduced illuminator power output level.

9. The method of claim 8, wherein analyzing the high-resolution depth map frame and the high-resolution image further comprises determining a depth of the foreground object.

10. The method of claim 4, wherein determining the mode of operation comprises:
   determining whether a depth of a foreground object is lower than a threshold depth; and
   determining an increased binning factor for the binned lower-resolution image in response to determining that the depth of the foreground object is lower than the threshold depth,
   wherein controlling the time-of-flight sensor according to the mode of operation further comprises capturing the binned lower-resolution image according to the increased binning factor.

11. The method of claim 1, wherein the high-resolution image comprises a binned image with a binning factor less-than or equal to the binning factor for the binned lower-resolution image.

12. The method of claim 1, wherein the time-of-flight sensor is a charge coupled device.

* * * * *